United States Patent Office 2,832,803
Patented Apr. 29, 1958

2,832,803

MANUFACTURE OF TRICHLOROACETIC ACID

Charles M. Eaker, St. Albans, W. Va., assignor to Monsanto Chemical Company, St. Louis, Mo., a corporation of Delaware No Drawing. Application April 25, 1957
Serial No. 654,987

11 Claims. (Cl. 260—539)

This invention relates to trichloroacetic acid; more specifically, this invention relates to an improved process for the production of trichloroacetic acid and compounds prepared therefrom.

Trichloroacetic acid is a well known article of commerce utilized in the preparation of many organic chemicals. Substantially pure trichloroacetic acid has a crystallizing point of approximately 58° C. In most industrial syntheses utilizing trichloroacetic acid, it is preferred that trichloroacetic acid be of such a degree of purity so as to have a crystallizing point greater than about 51° C., with such a composition containing in excess of 90% by weight of trichloroacetic acid. As usually prepared, the balance of such compositions is made up of dichloroacetic acid and a very minor amount of monochloroacetic acid. Various procedures for the preparation of such a commercial grade of trichloroacetic acid have been disclosed in the prior art. However, the procedure most frequently used is the direct chlorination of acetic acid in the presence of catalytic quantities, of the order of 5% or less, of such catalysts as acetic anhydride, acetyl chloride, sulfur, phosphorus, the oxides and chlorides of phosphorus and sulfur, etc. until the reaction product contains approximately 90% trichloroacetic acid.

According to the improved process for preparing trichloroacetic acid as described and claimed in U. S. Patent 2,613,220, the mixture comprising 15% to 75% by weight glacial acetic acid and 85% to 25% by weight of acetic anhydride is chlorinated until the reaction product contains about 90% of trichloroacetic acid. By this process, there is also produced trichloroacetyl chloride. When this reaction mixture is hydrolyzed with water, a high grade of commercial trichloroacetic acid is obtained. This process reduced the reaction time of the previously employed chlorination process by more than one-half.

Recently, a process for preparing trichloroacetic acid was described in U. S. Patent 2,674,620. This process involves the super-atmospheric chlorination of glacial acetic acid in the presence of a catalyst and actinic light. According to this patent, substantially all of the acetic acid is converted to trichloroacetic acid. The product obtained from this process has a melting point varying from 52° C. to about 56° C.

Ordinarily, when the chlorination of acetic acid is carried out at atmospheric pressure and reaction temperatures corresponding thereto, only about 90% of the acetic acid can be chlorinated to the trichloro stage. Attempts to chlorinate the remaining 10% of the acetic acid causes decomposition of the already formed trichloroacetic acid. Although a small amount of the remaining 10% acetic acid is chlorinated, a substantially greater portion of the already formed trichloroacetic acid is decomposed to phosgene, carbon monoxide, carbon dioxide and HCl. Thus, there is not available to the art a process for converting all of the acetic acid to trichloroacetic acid at atmospheric pressure. Moreover, although a process is provided for the conversion of substantially all of the acetic acid to trichloroacetic acid under super-atmospheric pressure, this process involves the use of rather high reaction temperatures and pressures up to 70 lbs. per sq. in. The design of the reaction equipment to accommodate such a process involves the use of rather expensive reaction equipment and does not in general reduce the cost of the trichloroacetic acid produced thereby.

It is an object of the invention to provide an improved process for the production of trichloroacetic acid at atmospheric pressure.

It is a further object of this invention to provide an improved atmospheric pressure process for the production of commercial grade trichloroacetic acid which is substantially pure trichloroacetic acid and an additional object of this invention is to provide an improved process for the preparation of derivatives of trichloroacetic acid.

Further objects of this invention will become apparent from a description of the novel process hereinafter set forth.

It has now been discovered that a mixture containing from about 15% to 75% glacial acetic acid and about 85% to about 25% acetic anhydride can be chlorinated until the reaction product reaches approximately the trichloroacetic acid stage, that is approximately 100% trichloroacetic acid and compounds hydrolyzable to trichloroacetic acid, by carrying out the chlorination process in the presence of an acid of phosphorus and preferably in the presence of a catalytic amount of an acid of phosphorus. By a "catalytic amount" is meant an amount up to about 2% by weight of the sum of the weight of glacial acetic acid and acetic anhydride. The use of more than about 2% by weight of an acid of phosphorus actually, although also providing for the preparation of a reaction product which is approximately 100% trichloroacetic acid and compounds hydrolyzable to trichloroacetic acid, appears to lower the chlorination efficiency. Any acid of phosphorus can be employed in the process of this invention such as hypophosphoric acid, metaphosphoric acid, orthophosphoric acid, pyrophosphoric acid, hypophosphorous acid, orthophosphorous acid, pyrophosphorous acid and the like. However, it is preferred to employ phosphoric acid ($H_3PO_4$) in the process of this invention and even more preferred is the use of 85% $H_3PO_4$ although less concentrated phosphoric acid, i. e., containing more than 15% water can be employed.

In general, the decomposition of trichloroacetic acid commences when the reaction product is at about 80% of the trichloroacetic acid stage. The cataylst can be added with the reactants or at any time when decomposition would occur or even added after decomposition occurs. Of course, in the latter case, the yields of trichloroacetic acid will be lower than when phosphoric acid is added before decomposition can occur. The addition of phosphoric acid prevents the decomposition of the trichloroacetic acid already formed. The presence of phosphoric acid in the reaction system does not prevent the formation of trichloroacetyl chloride, does not interfere with the conversion of the reaction by-products to trichloroacetic acid by the addition of water thereto and does not interfere with the formation of derivatives of trichloroacetic acid during the reaction of the reaction product mixture to form derivatives of trichloroacetic acid.

A preferred embodiment of the process of this invention comprises chlorinating a mixture containing from about 15% to 75% glacial acetic acid and from about 85% to 25% acetic anhydride in the presence of from 0.01% to about 1.0% phosphoric acid until substantially all of the reaction product has reached the trichloroacetic acid stage, that is substantially all trichloroacetic acid and compounds hydrolyzable to trichloroacetic acid.

Another preferred embodiment of the process of this invention comprises chlorinating a mixture containing from about 15% to 75% glacial acetic acid and from about 85% to 25% acetic anhydride until more than 80% but less than about 90% of the reaction product has reached the trichloroacetic acid stage, adding to the reaction from about 0.01% to about 1% by weight of phosphoric acid and continuing the chlorination until substantially all of the reaction product has reached the trichloroacetic acid stage. The addition of water to the product of this reaction in an amount sufficient to hydrolyze the hydrolyzable constituents thereof results in a product having a crystallizing point above 55° C. and up to about 57° C. or higher after the removal of hydrogen chloride gas formed during the hydrolyzing has been accomplished.

Still another preferred embodiment of the process of this invention comprising reacting the mixture obtained by chlorinating a mixture containing 15 to about 75% glacial acetic acid and about 85% to 25% acetic anhydride in the presence of phosphoric acid under such conditions that the trichloroacetyl chloride in said reaction mixture is converted to the same compound as is the trichloroacetic acid in said reaction mixture.

A comparison of the data set forth in the following examples will illustrate the unusual characteristics of the novel process of this invention. Example I is illustrative of a prior art process carried out at atmospheric pressure. In these examples all parts are by weight unless otherwise noted.

Example I

In this and subsequent examples, the apparatus utilized in carrying out the chlorination procedure described consists of a glass chlorinator equipped with an efficient agitator, a thermometer, chlorine injection tube and an efficient brine or water cooled condenser. Provision is also made for the absorption of the hydrogen chloride gas formed during the reaction and passed out of the reaction vessel into the condenser, and also for the periodic collection and analysis of the gases being evolved from the reaction mixture.

A mixture containing 28 parts of acetic anhydride and 542 parts of glacial acetic acid is charged to the chlorinator and with constant agitation, heated to a tempearture of about 95° C. When this temperature has been reached, gaseous chlorine is introduced into the reaction mixture at the rate of about 40 parts per hour. Initially, substantially complete chlorine absorption is obtained as evidenced by the off gas analysis, showing substantially 100% hydrogen chloride and negligible quantities of free chlorine. When approximately 30% conversion to the monochloro stage has been reached, chlorine efficiency significantly drops as shown by exceptionally large quantities of free chlorine in the off gas. At this point, the rate of chlorine addition is lowered to about 10 parts per hour, and there maintained until substantially complete conversion to the monochloro stage has been reached.

When this monochloro stage has been reached, the temperature is raised to about 150° C., and chlorination continued with the addition of chlorine at a rate of approximately 5-25 parts per hour.

When the reaction mixture contains at least 90% trichloroacetic acid and has a crystallizing point in excess of about 51° C., chlorination is stopped and the reaction mixture allowed to cool. The reaction mixture thus obtained is commercial grade trichloroacetic acid. Total elapsed time required for chlorinating the initial mixture to a reaction product containing at least 90% trichloroacetic acid is approximately 120 hours.

Example II

A mixture containing 25 parts of acetic anhydride and 75 parts of glacial acetic acid is charged to the chlorinator described in Example I and with constant agitation, heated to a temperature of about 95° C. When this temperature has been reached, gaseous chlorine is introduced into the reaction mixture at such a rate that substantially complete absorption takes place with negligible quantities of free chlorine being present in the off-gas.

While maintaining a temperature within the range of 70–110° C., chlorination is continued until the monochloroacetic acid stage has been reached. Thereafter, the temperature is rapidly raised to about 150° C. As the trichloroacetic acid stage is approached, phosphoric acid is added to the reaction medium periodically in an amount equal to about 0.04% based on the total of the glacial acetic acid and acetic anhydride charged (0.04 part of 85% $H_3PO_4$). Additional phosphoric acid is added as required but in general a total of less than 0.5% (in this case 0.5 part of 85% $H_3PO_4$) is required. When the trichloroacetic acid stage is reached, chlorination of the reaction mixture is stopped. Such a chlorination stage is reached in approximately 60 hours.

The reaction product thus obtained, prior to hydrolysis, has a trichloroacetic acid content of 97 to 98% or above. The reaction product can be converted into a reaction product containing approximately 100% trichloroacetic acid by adding water to the reaction product cooled to a temperature of about 100° C., and removing the hydrogen chloride gas formed, thereby hydrolyzing the reaction by-products, mainly trichloroacetyl chloride, contained in the reaction product to trichloroacetic acid. The trichloroacetic acid in the product obtained by hydrolysis represents more than 100% trichloroacetic acid based on the glacial acetic acid charged and approaches 100% as calculated from the acetic acid equivalents in the mixture of glacial acetic acid and acetic anhydride. The crystallizing point of the product obtained after hydrolysis is about 57° C.

In view of the composition of the reaction product prior to hydrolysis as above described, the reaction product prior to hydrolysis can be utilized in organic syntheses carried out in an aqueous medium, as under such conditions hydrolysis of the trichloroacetyl chloride to trichloroacetic acid will take place during the organic synthesis, or the reaction product prior to hydrolysis may be reacted under such conditions that the trichloroacetyl chloride contained in said reaction product is converted to the same compound as is the trichloroacetic acid also contained in the reaction product.

A comparison of the procedure set forth in Example II with that set forth in Example I indicates the outstanding utility of the novel process of this invention and the resulting significant improvement obtained by this novel process over the process heretofore used. According to the process described in the prior art, approximately 120 hours was required to obtain a usable, satisfactory trichloroacetic acid composition, i. e. a composition containing in excess of 90% trichloroacetic acid. According to the novel process of this invention, when carried out under similar circumstances, only approximately 60 hours is required to obtain a product containing substantially all trichloroacetic acid or is convertible to substantially pure trichloroacetic acid.

Example III

The process of Example II is repeated except that 85% phosphoric acid in an amount equal to 0.5% of the total weights of glacial acetic acid and acetic anhydride is added with the reactants before the addition of chlorine is started. The hydrolyzed reaction product obtained from this process has a crystallization point of about 56° C.

Example IV

In accordance with the procedure described in Example II, a mixture containing 42 parts of acetic anhydride and 58 parts of glacial acetic acid is chlorinated with gaseous chlorine. In this case a total of 0.4% of phosphoric acid is required before the chlorination is stopped. The crystallizing point of the reaction mixture indicates that substantially all of the reaction product is trichloroacetic acid. Hydrolysis of the reaction product results in a product having a crystallizing point of 56.8° C.

*Example V*

The procedure described in Example II is repeated utilizing a mixture containing 60 parts of acetic anhydride and 40 parts of glacial acetic acid. After 90% conversion of the reaction mixture to the trichloroacetic acid stage, phosphoric acid in an amount equal to a total of about 0.6% is added. Approximately 60 hours is required to obtain a reaction product which, on hydrolysis of the trichloroacetyl chloride contained therein, will have a crystallizing point in excess of about 57° C. after removal of the hydrogen chloride formed.

*Example VI*

The procedure described in Example II is repeated utilizing a mixture containing 85 parts of acetic anhydride and 15 parts of glacial acetic acid. In this process a total of about 1.0% phosphoric acid, 1.0 part of 100% $H_3PO_4$, is added after about 80% of the reaction product is converted to the trichloroacetic acid stage. In approximately 55 hours, a reaction product is obtained which, upon hydrolysis yields a reaction product having a crystallizing point of about 57° C. after removal of the hydrogen chloride formed.

It will be apparent to those versed in the art that the novel process of this invention as set forth in the preceding Examples II to V is subject to substantial variation. During chlorination, for example, the temperature may be varied over a wide range, such as in the range of from about 70° C. to about 170° C. Procedurally, it has been found particularly advantageous to maintain a temperature in the range of from about 70 to about 120° C. during the initial stages of chlorination, that is, up to approximately the formation of the monochloro derivative. After the monochloro stage has been reached, it is then preferred that the temperature be maintained at a higher level, such as in the range of from about 120 to about 170° C., as such higher temperature enhances the formation of the trichloro derivative.

Also, the addition of phosphoric acid is subject to variation. For example, as previously stated, the phosphoric acid can be added before chlorination is started, or added after monochloroacetic acid is formed or added at any time prior to reaching about 80% conversion of the reaction product to the trichloro derivative. As aforementioned it is preferred that phosphoric acid or other acid of phosphorus be added when more than 80% but less than about 90% of the reaction product has reached the trichloroacetic acid stage. Phosphoric acid can be added dropwise or intermittently in quantities amounting about $\frac{1}{10}$ or more of the total requirement for the process.

Inasmuch as one mol of hydrogen chloride gas is formed on the introduction of each atom of chlorine into the chloroacetic acid molecule, means should be provided for the efficient removal of this gas. This hydrogen chloride may be merely vented to the atmosphere or, if desired, absorbed in a suitable absorber, such as water or an alkaline solution. The chlorinator wherein the reaction is carried out should be equipped with an adequate condenser to prevent loss of the reactants or the desired reaction products during the chlorination process.

The desired product of the novel process of this invention is that product containing substantially only trichloroacetic acid and compounds convertible to substantially pure trichloroacetic acid by hydrolysis. According to the novel process of this invention, chlorination is continued until the reaction product obtained is such that upon the addition of water to the reaction product in an amount sufficient to hydrolyze the hydrolyzable by-products contained therein, a reaction product results having a crystallizing point of from 55° to 57° C. or higher after removal of the hydrogen chloride gas. Such a reaction product will be substantially pure trichloroacetic acid.

The reaction product obtained from the chlorination process of this invention can be utilized as such in subsequent industrial organic syntheses inasmuch as the reaction by-products, mainly trichloroacetyl chloride, contained therein reacts with other compounds to produce the same compound as does trichloroacetic acid similarly reacted, or it may be treated with water or hydrolyze the reaction product to trichloroacetic acid, thereby obtaining a reaction product comprising substantially pure trichloroacetic acid and having a crystallizing point of from 55° to 57° C., or higher after removal of the hydrogen chloride formed during this hydrolysis. Due to the nature of the reaction, the quantities of trichloroacetyl chloride and any other hydrolyzable by-products contained therein formed during the chlorination process, vary slightly from batch to batch. Consequently, it is not possible to specify the exact quantity of water to be added to the reaction product in order to completely hydrolyze these impurities. Generally, this quantity of water is of the order of from about 0.5 to about 5% by weight of the reaction product. Practically, however, the quantity of water added is that quantity of water at least sufficient to hydrolyze all of the hydrolyzable impurities contained in the reaction product resulting in a reaction product having a maximum crystallizing point in excess of about 55° C. after removal of the hydrogen chloride formed during the hydrolysis. Inasmuch as one molecular proportion of hydrogen chloride will be formed for each molecular proportion of trichloroacetyl chloride hydrolyzed, it is necessary to remove this hydrogen chloride if a reaction product having a crystallizing point in excess of 55° C. to 57° C. or higher is desired. If the hydrogen chloride is not removed, it will depress the crystallizing point of the reaction product in much the same manner as does trichloroacetyl chloride.

In carrying out this hydrolysis reaction, the water may be added in small increments, determining the crystallizing point of the reaction product after the addition of each increment and removal of the hydrogen chloride formed during the hydrolysis and stopping the addition of water when the crystallizing point of the reaction product has reached a maximum in excess of about 55° C. A more convenient method for determining the amount of water to be added to the reaction product in order to raise the crystallizing point of the reaction product to a maximum in excess of about 55° C. is to withdraw from the reaction product a small weighed laboratory size sample and determine the quantity of water necessary to raise the crystallizing point of this sample to a maximum in excess of 55° C. From this result, the total quantity of water necessary to hydrolyze all of the hydrolyzable materials in the entire batch of the reaction product may be calculated.

The actual hydrolysis is carried out by mixing the water with the reaction product at a temperature in excess of the melting point of the reaction product, i. e., in excess of about 57° C., and in the range of from about 57° C., to about 170° C. Preferably the hydrolysis is carried out at a temperature of from 90° C. to 120° C. Higher temperatures than 170° C. may be utilized but offer no significant advantage. The hydrogen chloride may be removed from the reaction product by any convenient method well known to those skilled in the art. For example, the evolution of hydrogen chloride may be permitted to proceed naturally, aided only by agitation of the reaction product, or the reaction product may be placed under reduced pressure. Although the crystallizing point of the reaction product, indicative of its purity is determined on a substantially hydrogen chloride free sample, all of the hydrogen chloride need not be removed from the reaction product at this stage. If the trichloroacetic acid thus prepared is to be utilized in a reaction wherein free hydrogen chloride will have no deleterious effect, complete removal of the hydrogen chloride need not be accomplished at this stage.

As was previously pointed out, due to the nature of the reaction product obtained in the novel process of this invention, prior to hydrolysis, the reaction product, prior to hydrolysis, may be used directly in various organic syntheses wherein trichloroacetic acid of commercial grade or better is used as a reactant. Typical examples of such utility are the preparation of the salts of trichloroacetic acid and the esters of trichloroacetic acid. In preparing the salts of trichloroacetic acid, trichloroacetic acid is reacted with an alkaline derivative of the desired salt forming element either in an aqueous medium or in a dry state. For example, sodium trichloroacetate would be prepared by reacting sodium hydroxide or sodium carbonate with trichloroacetic acid, either in the dry state or in an aqueous medium. If carried out in an aqueous medium, the trichloroacetyl chloride would be hydrolyzed to trichloroacetic acid which would then react with the alkaline material. If carried out in a dry state, the alkaline material would react directly with trichloroacetyl chloride, forming sodium trichloroacetate.

As a further example of the utility of the reaction product obtained in the novel process of this invention, prior to hydrolysis, is the preparation of esters of trichloroacetic acid. Inasmuch as trichloroacetyl chloride reacts with an alcohol to form the same ester of trichloroacetic acid as does trichloroacetic acid itself when reacted with the same alcohol, commercial grade esters of trichloroacetic acid may be prepared by merely esterifying the reaction product obtained herein prior to hydrolysis, with an alcohol.

The following examples illustrate these various utilities of the reaction product obtained according to the novel process of this invention:

*Example VII*

Twenty parts by weight of soda ash are placed in a suitable reaction vessel. With constant agitation, 60 parts by weight of the reaction product prior to hydrolysis obtained in Example III are slowly added over a period of one hour at a temperature of 60° C. After all of the reaction product has been added and the reaction mixture thoroughly mixed, the mass is allowed to cool to room temperature. The commercial grade of sodium trichloroacetate produced in accordance with this procedure has the following approximate analysis:

| | |
|---|---|
| Sodium trichloroacetic acid | 93.1 |
| Sodium dichloroacetic acid | 3.0 |
| NaCl | 1.4 |
| $Na_2CO_3$ | Trace |
| $NaHCO_3$ | 1. |
| $H_2O$ | 0.3 |

In addition to the above described sodium trichloroacetate, the reaction product of the novel process of this invention, prior to hydrolysis, may be utilized in preparing other alkali metal salts of trichloroacetic acid, such as potassium and lithium salts, the alkaline earth metal salts such as the magnesium and calcium salts, the ammonium salt, etc.

*Example VIII*

In a suitable esterification reaction vessel is placed 60 parts of the reaction product prior to hydrolysis as obtained in Example III and 35 parts of isopropyl alcohol. The esterification reaction is carried out by heating the reaction mixture thus obtained and distilling off the water of esterification formed. After the esterification reaction is complete, the isopropyl trichloroacetate thus produced is purified by means of a straight take-over distillation and will be a clear colorless liquid.

In addition to the above described isopropyl ester of trichloroacetic acid, the reaction product obtained according to the novel process of this invention prior to hydrolysis, may be esterified with other monohydric or polyhydric alcohols which may be either saturated or unsaturated, primary, secondary or tertiary, substituted or unsubstituted or aliphatic, aromatic or heterocyclic in nature. Among such alcohols are: primary alkyl alcohols such as methyl alcohol, ethyl alcohol, propyl alcohol, butyl alcohol, amyl alcohol, hexyl alcohol, heptyl alcohol, octyl alcohol, nonyl alcohol, decyl alcohol, undecyl alcohol, dodecyl alcohol, tetradecyl alcohol, cetyl alcohol, octadecyl alcohol, and the like;

Secondary alkyl alcohols such as isopropyl alcohol, secondary butyl alcohol, secondary amyl alcohol, secondary hexyl alcohol, secondary octyl alcohol, secondary nonyl alcohol, and the like;

Tertiary alkyl alcohols such as tertiary butyl alcohol, tertiary amyl alcohol, tertiary butyl carbinol, tertiary amyl carbinol, and the like;

Aromatic alcohols such as benzyl alcohol, methylphenylcarbinol, phenylmethyl alcohol, and the like;

Alicyclic alcohols such as cyclohexanol, cyclobutylcarbinol, cyclopentanol, and the like:

Heterocyclic alcohols such as furfuryl and tetrahydrofurfuryl alcohols, and the like;

Unsaturated aliphatic alcohols such as allyl alcohol, methallyl alcohol, crotyl alcohol, and the like;

Substituted alcohols such as ethoxy ethyl alcohol, ethylene chlorohydrin, cyanohydrin, 2-bromoethanol, and the like;

Polyhydric alcohols such as ethylene glycol, propylene glycol, butylene glycol, 1,2-propanediol, glycerol, polyethylene glycols, and the like; in which cases the ester produced may be either the neutral or partial ester.

This application is a continuation-in-part of application Serial Number 442,177, filed July 8, 1954, now abandoned.

What is claimed is:

1. In a process for the production of trichloroacetic acid, the step comprising chlorinating a mixture containing about 15% to about 75% glacial acetic acid and about 85% to about 25% acetic anhydride in the presence of up to about 2% by weight of an acid of phosphorus to approximately the trichloroacetic acid stage.

2. In a process for the production of trichloroacetic acid, the step comprising chlorinating a mixture containing about 15% to about 75% glacial acetic acid and about 85% to about 25% acetic anhydride in the presence of up to about 2% by weight of phosphoric acid to approximately the trichloroacetic acid stage.

3. In a process for the production of trichloroacetic acid, the steps comprising chlorinating a mixture containing about 15% to about 75% glacial acetic acid and about 85% to about 25% acetic anhydride until prior to the formation of trichloroacetic acid, adding phosphoric acid thereto up to about 2% by weight of said mixture and continuing the chlorination until substantially all of the reaction mixture is converted to trichloroacetic acid.

4. In a process for the production of trichloroacetic acid, the step comprising chlorinating a mixture containing about 15% to about 75% glacial acetic acid and about 85% to about 25% acetic anhydride to approximately the point where the formation of trichloroacetic acid begins, adding phosphoric acid up to about 2% of the sum of the weights of glacial acetic acid and acetic anhydride, continuing the chlorination until substantially all of the acetic acid and acid anhydride are converted to the trichlorinated derivative, hydrolyzing the resulting product with an amount of water sufficient to hydrolyze the hydrolyzable impurities contained therein, and removing the hydrogen chloride gas formed during the hydrolysis.

5. In a process for the production of trichloroacetic acid, the step comprising chlorinating at a temperature in the range of from about 70° C. to about 170° C., a mixture containing about 15% to about 75% glacial acetic acid and about 85% to about 25% acetic anhydride to approximately where about 80% to about 90% of the reaction mixture has been converted to trichloroacetic acid stage and thereafter adding up to about 2% by weight phosphoric acid to the reaction medium while continuing the chlorination.

6. In a process for the production of trichloroacetic acid, the steps comprising chlorinating at a temperature in the range of from about 70° C. to about 170° C., a mixture containing about 15% to about 75% glacial acetic acid and about 85% to about 25% acetic anhydride until about 80% to about 90% of the reaction mixture has been converted to trichloroacetic acid stage, and periodically adding up to about 2% by weight phosphoric acid to the reaction medium while continuing the chlorination.

7. In a process for the production of trichloroacetic acid, the steps comprising chlorinating at a temperature in the range of from about 70° C. to about 170° C., a mixture containing about 15% to about 75% glacial acetic acid and about 85% to about 25% acetic anhydride and during the latter stages chlorinating in the presence of up to about 1% by weight of phosphoric acid based on the sum of the weights of acetic acid and acetic anhydride thus forming a reaction product which in hydrolysis with an amount of water sufficient to hydrolyze the hydrolyzable impurities contained therein results in a reaction product having a crystallizing point in excess of 55° C. after removal of the hydrogen chloride gas formed during the hydrolysis.

8. In the process for the production of trichloroacetic acid, the steps comprising chlorinating a mixture containing about 15% to about 75% glacial acetic acid and about 85% to about 25% acetic anhydride up to approximately the point where the addition of water to the reaction product thus obtained in an amount sufficient to hydrolyze the hydrolyzable impurities contained therein, results in a reaction product having a crystallizing point in excess of 55° C. after removal of the hydrogen chloride gas formed during the hydrolysis, while maintaining during said chlorination a temperature in the range of from about 70° C. to about 120° C. until approximately the monochloro stage is reached and thereafter maintaining a temperature in the range of from about 120° C. to about 170° C. while periodically adding up to about 2% by weight phosphoric acid.

9. In a process for the production of trichloroacetic acid, the step comprising chlorinating a mixture containing about 15% to about 75% glacial acetic acid and about 85% to about 25% acetic anhydride, maintaining a temperature in the range of from about 70° C. to about 170° C. and, during the latter portion of the chlorination, adding up to about 2% by weight phosphoric acid to the reaction medium, continuing the addition of chlorine; until the addition to the reaction product thus formed of an amount of water sufficient to hydrolyze the hydrolyzable impurities contained therein results in a reaction product having a crystallizing point greater than about 55° C. after removal of the hydrogen chloride gas formed during the hydrolysis; and thereafter adding said equivalent amount of water to the reaction product until the crystallizing point of the reaction product is greater than about 55° C. after removal of the hydrogen chloride formed.

10. In a process for the preparation of trichloroacetic acid, the step comprising adding to (A) the reaction product obtained by chlorinating a mixture containing about 15% to about 75% glacial acetic acid and about 85% to about 25% acetic anhydride, while maintaining a temperature during said chlorination in the range of from about 70° C. to about 170° C. and carrying out the latter portion of the chlorination in the presence of up to about 2% by weight phosphoric acid to the point where the addition of water to said reaction product to hydrolyze the hydrolyzable impurities contained therein results in a product having a crystallizing point greater than about 55° C. after removal of the hydrogen chloride gas formed during the hydrolysis, (B) a quantity of water at least sufficient to raise the crystallizing point of said reaction product to a temperature of at least about 55° C. after removal of the hydrogen chloride formed.

11. In a process for the preparation of trichloroacetic acid, the step comprising contacting (A) the reaction product obtained by chlorinating a mixture containing about 15% to about 75% glacial acetic acid and about 85% to about 25% acetic anhydride, while maintaining a temperature during said chlorination in the range of from about 70° C. to about 170° C. to approximately the point where about 80% of the reaction product is converted to the trichloroacetic acid stage and thereafter completing the chlorination in the presence of up to about 2% by weight phosphoric acid to provide a reaction product to which the addition of water in an amount sufficient to hydrolyze the hydrolyzable impurities contained in said product results in a product having a crystallizing point greater than about 55° C. after removal of the hydrogen chloride gas formed during the hydrolysis; with (B) a quantity of water at least sufficient to hydrolyze the hydrolyzable impurities present in said reaction product.

No references cited.